(No Model.)  
A. W. O. ROTH.  
OPHTHALMOSCOPE.  
2 Sheets—Sheet 1.
No. 507,934.  
Patented Oct. 31, 1893.
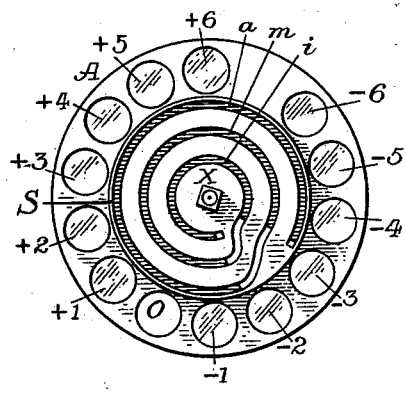
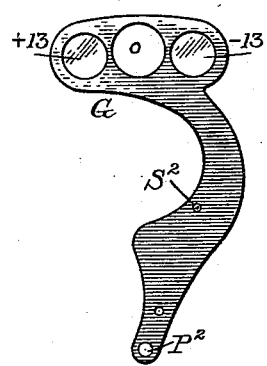
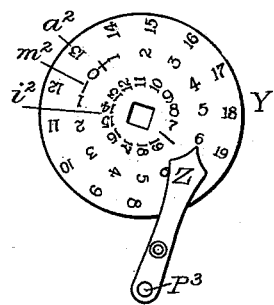
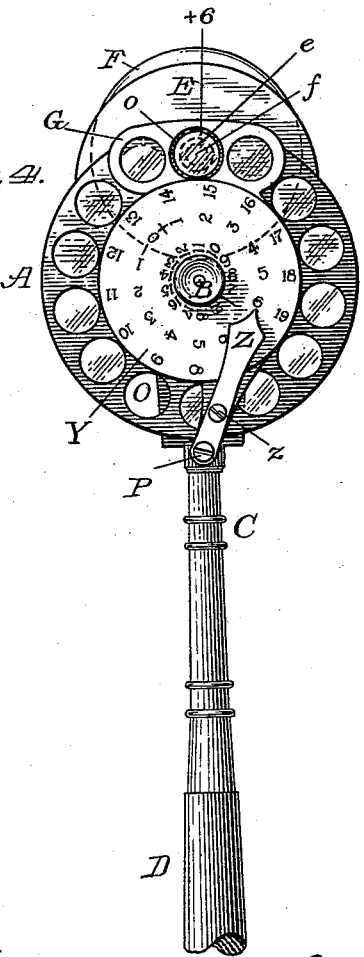

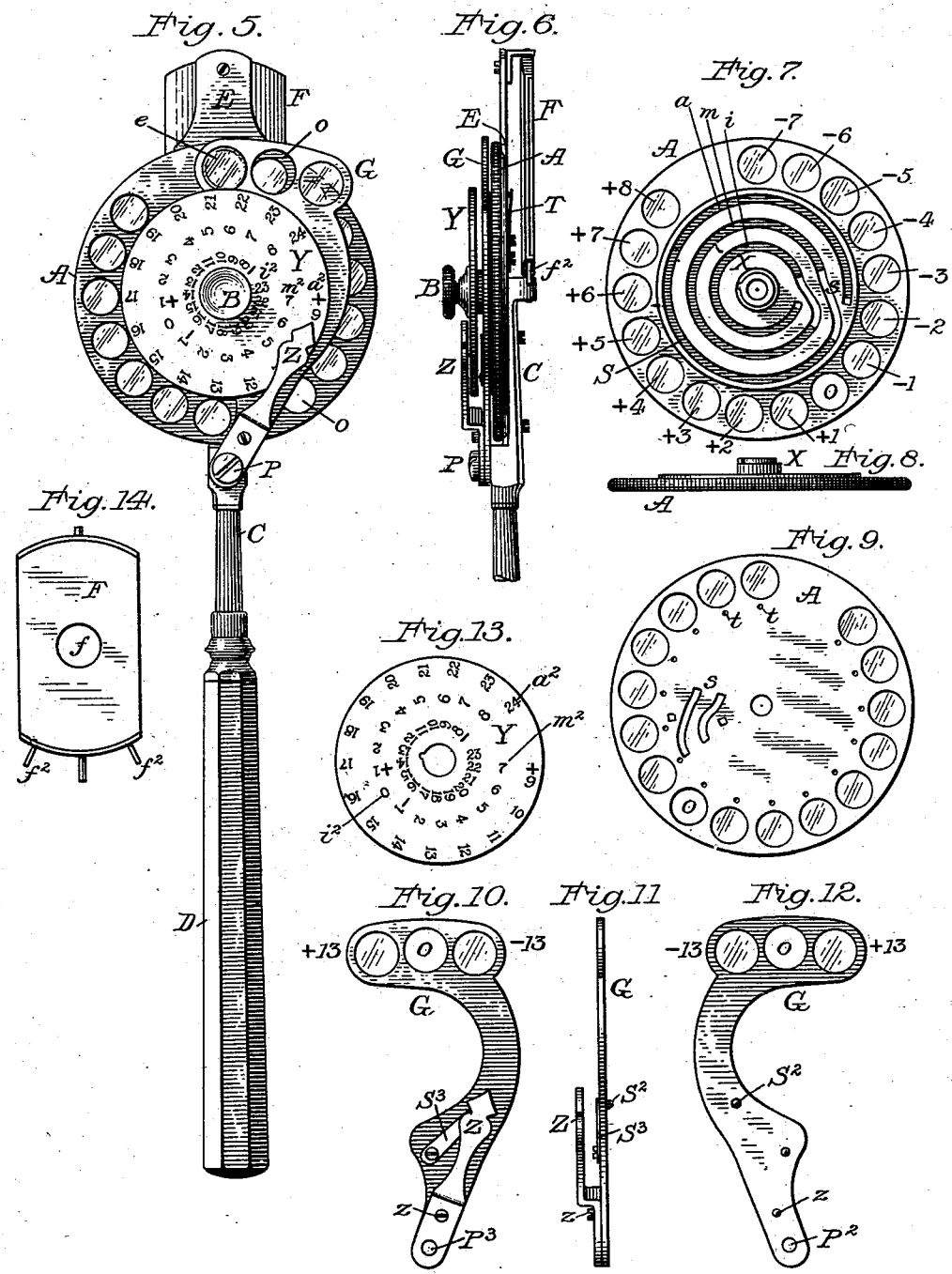

UNITED STATES PATENT OFFICE.

AUGUST WILHELM OTTO ROTH, OF BERLIN, GERMANY, ASSIGNOR TO EMIL B. MEYROWITZ, OF NEW YORK, N. Y.

OPHTHALMOSCOPE.

SPECIFICATION forming part of Letters Patent No. 507,934, dated October 31, 1893.

Application filed March 24, 1893. Serial No. 467,498. (No model.) Patented in Germany April 5, 1892, No. 66,215, and in Austria-Hungary November 1, 1892, No. 29,187 and No. 61,474.

*To all whom it may concern:*

Be it known that I, AUGUST WILHELM OTTO ROTH, known as "Dr. A. ROTH," a subject of the Emperor of Germany, and a resident of Berlin, Germany, have invented a new and useful Improvement in Ophthalmoscopes, (patented to me in Germany by Letters Patent No. 66,215, dated April 5, 1892, and to F. Fritsch, in Austria-Hungary, by Letters Patent No. 29,187 and No. 61,474, dated November 1, 1892,) of which the following is a specification.

This invention relates to those "ophthalmoscopes" which are designed for testing the focus of vision by means of dioptric lenses.

The invention consists in certain novel combinations of parts, hereinafter set forth and claimed; and its objects are (first) to extend the main or revolving series of lenses in the so-called "rekosh" disk by means of a segment carrying the supplemental lenses, and automatically moved by coaction with said disk, so that all the various exposures of lenses may be made without removing the instrument from the eye, and (second) to indicate the exact value of each lens or combination of lenses by a dial and pointer so that the indication may be easily and correctly read.

Two sheets of drawings accompany this specification as part thereof.

Figure 1 of these drawings (Sheet 1) is a face view of an improved rekosh disk. Fig. 2 is an elevation of a superposed lever or segment. Fig. 3 is a face view of the corresponding dial and pointer, and Fig. 4 is a face view of the improved ophthalmoscope produced by uniting said disk, segment, dial and pointer with other parts. Figs. 5 to 14 inclusive (Sheet 2) represent the improved ophthalmoscope and its principal parts as remodeled for the American market; Fig. 5 being a face view of the instrument, Fig. 6 an edge view of its upper portion, Figs. 7, 8 and 9 face, edge and back views of the improved rekosh disk, Figs. 10, 11 and 12 front, edge and back views of the united segment and pointer, Fig. 13 a face view of the dial, and Fig. 14, a face view of the mirror.

Like letters and numerals refer to corresponding parts in all the figures.

In common with other ophthalmoscopes of the same class, each of the improved instruments comprises a rekosh disk A (Fig. 1 or Figs. 7 to 9) attached, by an arbor-screw B, to a metallic support C, at the extremity of a convenient handle D, and in front of a rear mask E, which is attached to the same support and has a small hole $e$, Figs. 4 and 5, with which a like hole $f$, Figs. 4, 5 and 14, in a mirror F behind the mask, coincides when the mirror is in working position; said disk being provided with a series of plus lenses, marked in Figs. 1 and 7 according to their respective diopters $+1$, $+2$, &c., an open hole O, and a series of minus lenses, marked, in Figs. 1 and 7, $-1$, $-2$, &c., all of which are arranged in one broken circle concentric with said arbor-screw B, and at the same radial distance therefrom as said holes $e$ and $f$, so as to be successively brought into line with said holes by rotating the disk. In addition, the improved rekosh disk A is provided with means for automatically transmitting motion to a superposed lever or swinging segment G (Fig. 2 or Figs. 10 to 12) which is attached to said support C by a pivot-screw P below the disk, and is provided with plus and minus lenses, marked, in Figs. 2 and 10, $+13$ and $-13$, respectively, together with an open hole $o$ between them, all at the same radial distance from said pivot-screw P as said holes $e$ and $f$; such means for automatically moving this segment consisting preferably of a "spiral" groove S in the middle portion of the disk, in the form of three concentric broken rings, $a$, $m$, $i$, connected in series by flat S-shaped curves, and a stud $S^2$ projecting into said groove from the back of the segment G.

The improved rekosh disk A of each instrument is further provided with a hub X for carrying in front thereof and in front of the segment G a dial Y (Fig. 3 or Fig. 13) provided with characters, descriptive of the several lenses and their combinations, arranged in three circles, $a^2$ $m^2$ $i^2$, corresponding with said rings $a$ $m$ $i$ of the groove S. Means are also provided in each improved instrument for moving in unison with the segment a pointer Z (Fig. 3 or Figs. 10 and 11) to coact with said dial Y. The pointer is conveniently provided with a pivot-hole $P^3$, Figs. 3 and 10, which coincides with the pivot-hole $P^2$, Figs. 2 and 12, of the segment, and with a screw-tapped hole in the support C, to receive said pivot-screw P, and is fixedly attached to the segment, as in Fig. 4 and Figs. 10 and 11, by another screw $z$, so as to be carried by the segment, and thus moved therewith.

The operation is as follows: Starting with the German instrument in the condition represented by Fig. 4 for example, and turning the disk A to the left, the stud $S^2$ will glide from the middle ring $m$ of the groove S into its outer ring $a$, carrying with it the segment G so as to bring the lens $+13$, Fig. 2, in front of the lens $-6$, Fig. 1, and both in front of said holes $e$ and $f$, for the lens-value $+7$, and shifting at once the dial Y and the pointer Z so as to indicate such face-value. Another movement of the disk A to the left brings the lens $-5$ behind said lens $+13$, and turns the dial for the value $+8$; and so on, to the plus limit of the instrument, which in this example is the combination of $+13$ and $+6$, equaling $+19$. On turning the disk A to the right in said position, Fig. 4, the open hole $o$ of the segment G remains opposite said holes $e$ and $f$ until the remainder of the plus lenses, $+5$ to $+1$, the zero hole O, and the minus lenses, $-1$ to $-6$, have successively come behind said hole $o$; and the stud S then glides from the middle ring $m$ of the groove into the inner ring $i$; the lens $-13$ Fig. 2, of the segment comes in front of the lens $+6$ in the disk for the lens-value $-7$; the dial Y and pointer Z are simultaneously moved to indicate this value; and so on, until the minus limit of the instrument is reached, which in the example is the combination of $-13$ and $-6$, equaling $-19$. In the American instrument, Figs. 5 to 14, by providing the disk A with two additional plus lenses and one additional minus lens, the capacity of the instrument is made to extend from $+24$ to $-23$. The number of lenses in the disk may be larger or smaller as may be preferred; half-diopter lenses can if desired be introduced, and other like modifications will suggest themselves to those skilled in the art. In the German instrument, Fig. 1, &c., the stud $S^2$ Fig. 2 projects rigidly from the segment G, and when either end of the groove S is reached the motion of the disk A must be reversed and it must be given one and a half turns to bring the instrument to zero. In the American instrument Fig. 5, &c., the stud $S^2$ is mounted on the free end of a blade spring $S^3$ attached to the segment, and the protruding end of the stud is beveled, as in Figs. 10 and 11, so that by continuing the motion of the disk A the stud may be sprung out of the end of the groove into the beginning of the outer ring or the inner ring as the case may be and the instrument may then be brought quickly to zero by a short reverse turn of the disk. The four holes shown in the disk A at $s$, in Figs. 7 and 9, facilitate forming the ends and connecting curves of the groove S so as to render them smooth. See Fig. 9. A spring detent T, Fig. 6, engaging with indentations $t$, Fig. 9, in the back of the disk A, is preferably added to facilitate stopping the disk with the lenses in alignment with the holes $e$ and $f$.

The mirror F may be of any preferred kind. In the German instrument a circular mirror, F Fig. 4, is attached by a spring hinge (not shown) at its lower edge. In the American instrument a tilting mirror, F, Figs. 5, 6 and 14, is attached by a pair of pivots, and is provided with a pair of downwardly projecting studs, $f^2$ Fig. 14, by which to readily shift it.

Having thus described the said ophthalmoscopes, I claim as my invention and desire to patent under this specification—

1. The combination, in an ophthalmoscope, of a lens-carrying disk, a segment provided with supplemental lenses, and means substantially as described for transmitting motion from said disk to said segment as the disk is turned, whereby said segment is automatically shifted to combine the lenses.

2. The combination, in an ophthalmoscope, of a lens-carrying disk, a segment provided with supplemental lenses, a dial which rotates with said disk, a pointer movable with said segment, and means substantially as described for transmitting motion from said disk to said segment and pointer as the disk is turned, whereby the lenses are combined automatically, and their value is indicated by said pointer.

3. An ophthalmoscope which comprises a lens-carrying disk provided with a groove in the form of three broken rings concentric with the arbor of the disk and connected with each other in series, a segment having plus and minus supplemental lenses with an open hole between them, and provided with a stud which follows said groove, a dial turning with said disk and having lens-value characters thereon in three concentric circles corresponding with the rings of said groove, and a pointer moving with said segment and coacting with said dial, substantially as hereinbefore specified.

AUGUST WILHELM OTTO ROTH.

Witnesses:
 GEORG HEUERMANN,
 F. DËUS.